Aug. 22, 1967  W. FARNWORTH  3,337,273
RE-ENTRAINMENT APPARATUS FOR CONVEYING PIPE-LINES
Filed Dec. 6, 1965  2 Sheets-Sheet 1
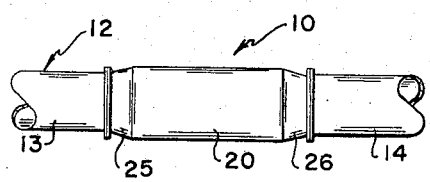
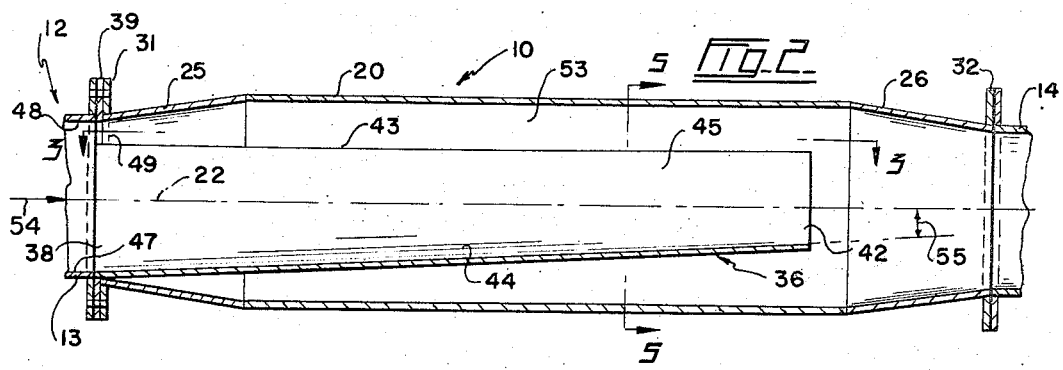
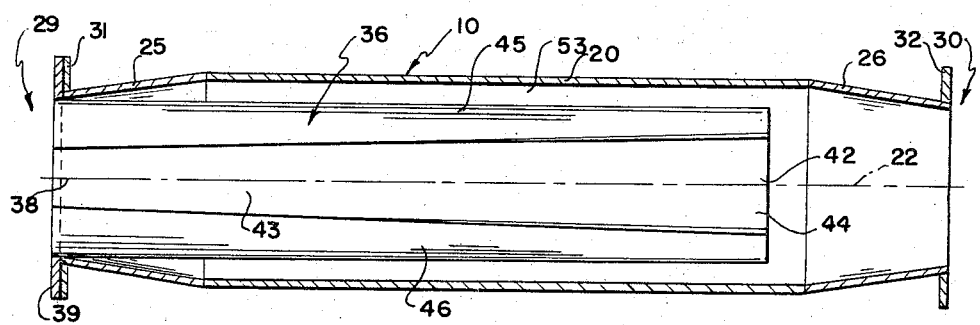
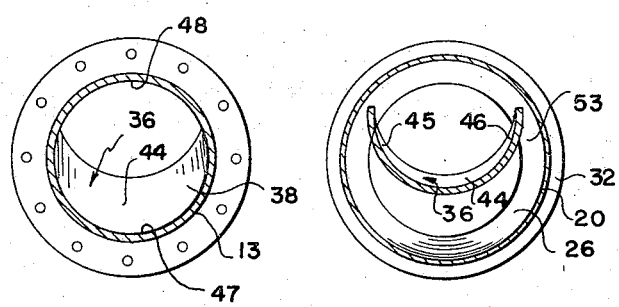
INVENTOR
WILFRED FARNWORTH
BY
*Featherstonhaugh & Co.*
ATTORNEYS

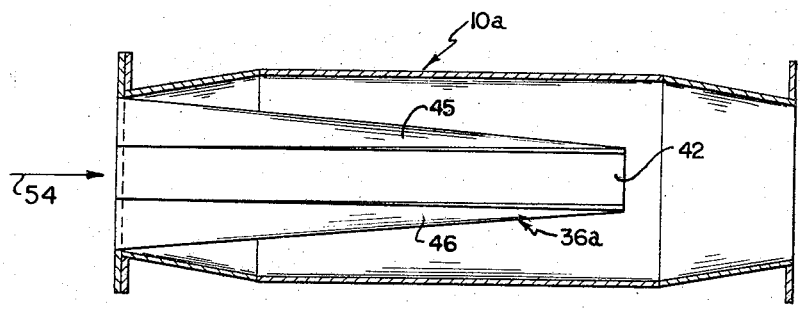
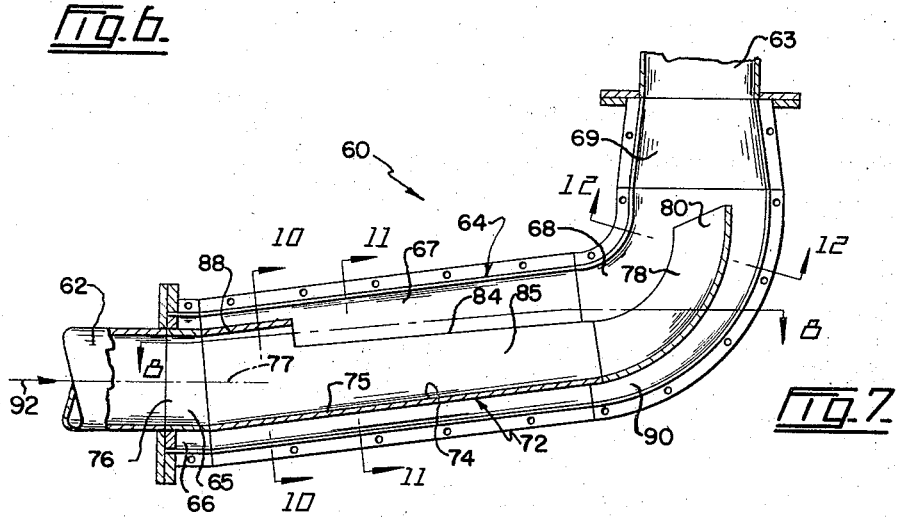

United States Patent Office 3,337,273
Patented Aug. 22, 1967

3,337,273
RE-ENTRAINMENT APPARATUS FOR
CONVEYING PIPE-LINES
Wilfred Farnworth, North Vancouver, British Columbia, Canada, assignor to Rader Pneumatics & Engineering Co., Ltd., British Columbia, Canada
Filed Dec. 6, 1965, Ser. No. 511,668
25 Claims. (Cl. 302—64)

ABSTRACT OF THE DISCLOSURE

Apparatus for re-entraining particulate material into the conveying fluid of a conveying pipe-line when said material has tended to separate therefrom, and including a deflector for gathering particulate material moving along a surface of the pipe-line and directing said material into the conveying fluid centrally thereof in the direction of movement of the fluid while allowing the latter to flow around the deflector and the material moving thereover.

This invention relates to apparatus for re-entraining particulate material being moved by a conveying fluid through a conveying pipe-line.

Although this apparatus is particularly designed for re-entraining particulate material in a gaseous conveying fluid, such as air, it can also be used in pipe-lines in which liquid is the conveying medium. The term "particulate material" is intended to include any material that can be moved by a fluid medium through a pipe-line, such as, for example, powders, granular materials, wheat, sawdust or chips, and the like.

When particulate material is being moved by a conveying fluid through a conveying pipe-line, there is a tendency for the material to separate from the fluid and to move along the bottom surface of the line. This happens in relatively long straight lines, horizontal and inclined, and particularly in curves or elbows where centrifugal force throws the heavier particulate material towards the outer curved wall of the line, said outer curved wall being considered herein the bottom wall of the line regardless of the disposition of the curve. It has been found that the present apparatus is helpful in all curves. The particulate material is thrown against the outer curved wall in these curves, and it is believed that there is a tendency for the material to remain in the relatively low velocity conveying medium along the pipe wall rather than return to the high velocity medium flowing along the centre of the pipe. Some prior efforts have been made to re-entrain the separated particulate material, but these have not been very successful since they create other problems. For example, baffles have been placed along the bottom surface of the pipe-line, these baffles directing any particulate material travelling along the line bottom across the general flow of the conveying fluid. This creates undue turbulence in the conveying medium, interferes with the flow of the medium, and does not entrain all of the particulate material since the general momentum of the latter is destroyed by the sudden change of direction of the movement thereof.

The present re-entrainment apparatus eliminates or greatly reduces these problems. The apparatus comprises an entraining pipe unit adapted to be inserted in conveying pipe-line so that the coveying fluid thereof moves through this unit. The unit is straight or curved depending upon whether it is to be inserted in a straight portion or a curved or elbow portion of the line. A deflector is mounted in the entraining unit and extends generally longitudinally thereof. This deflector is shaped to gather particulate material moving along a surface of the pipe-line, usually, the bottom surface, and to direct said gathered material into the conveying fluid moving through the unit at substantially the axial centre of said fluid and in the general direction of movement thereof. The deflector at the entrance end thereof preferably is about the same width as the pipe-line and has a lower or deflecting surface substantially aligned with or slightly inclined to the bottom surface of a straight line or the outer curved surface of a curved line. Said deflector is open along the top or inner portion thereof. This top or inner portion of the deflector is preferably aligned with the direction of movement of the conveyed material and substantially level with the surface of the inlet pipe opposite the surface of the latter along which the particulate material travels so that the material is retained in the deflector and the conveying fluid spills out thereof while moving axially of the entraining unit into the space around the outlet end of the deflector. It is preferable to make the pipe unit of a larger diameter than the conveying line in order to enable this spilling out of the conveying medium to take place, although the pipe unit can be substantially the same diameter as the pipe-line in which case the deflector gradually changes from a substantially circular cross sectional shape near said inlet end to a substantially U cross section towards said outlet end. With this arrangement, the deflector discharges particulate material into the axial centre of the moving fluid and in the direction of movement thereof. This has the advantage that the particulate material is discharged into the fluid where the velocity thereof is greatest. The material always moves substantially in an axial direction so that it loses very little or any of its own momentum.

Examples of this invention are illustrated in the accompanying drawings, in which, FIGURE 1 is a reduced elevation of a portion of a conveying pipe-line having one form of re-entrainment apparatus therein, FIGURE 2 is a longitudinal section on a vertical plane through said one form of the entrainment apparatus, FIGURE 3 is a horizontal section taken on the line 3—3 of FIGURE 2, FIGURE 4 is an elevation of the inlet end of the apparatus of FIGURE 2, FIGURE 5 is a cross section taken on the line 5—5 of FIGURE 2, FIGURE 6 is a view similar to FIGURE 3 showing an alternative deflector which diminishes in cross sectional area, FIGURE 7 is a longitudinal sectional view similar to FIGUURE 2 through an alternative form of re-entrainment apparatus, FIGURE 8 is a horizontal section taken on line 8—8 of FIGURE 7, FIGURE 9 is an elevation of the inlet end of the apparatus of FIGURE 7, and FIGURES 10, 11 and 12 are typical cross sections taken respectively on the lines 10—10, 11—11, and 12—12 of FIGURE 7.

Referring to FIGURE 1 of the drawings, 10 is one form of re-entrainment apparatus according to the present invention inserted in a conveying pipe-line 12 having an inlet pipe 13 extending to apparatus 10 and an outlet pipe 14 extending away therefrom. The illustrated pipe-line 12 is straight, and may extend in a horizontal plane or be inclined up or down relative to said plane.

FIGURES 2 to 5 illustrate apparatus 10. This apparatus includes an entraining pipe unit 20 which when installed in line 12 extends along or is slightly inclined to the longitudinal axis 22 thereof. Unit 20 may have any suitable cross sectional shape, but is usually circular in cross section, as shown.

Unit 20 is preferably of larger cross sectional area than the pipe-line 12 into which it is connected. In this case, it is preferable to provide unit 20 with a conical inlet secton 25 and a similar conical outlet section 26. Sections 25 and 26 converge in directions extending axially away from unit 20. Unit 20 can be integrally formed with conical sections 25 and 26, as shown, or these sections and the unit can be formed separately and welded, bolted or otherwise secured together.

Unit sections 25 and 26 form respectively inlet and outlet ends 29 and 30 for unit 20. Unit 20 can be connected to pipes 13 and 14 of pipe-line 12 in any desired manner, and this example, unit sections 25 and 26 are provided with end flames 31 and 32 for this purpose.

A deflector 36 is mounted in and extends longitudinally of unit 20. The deflector is held in spaced relationship to the confining wall of unit 20 in any convenient manner, and in this example, entrance end 38 of the deflector is provided with a fiange 39 that overlaps flange 31 and is secured to said flange when the latter is connected to a corresponding flange on pipe 13 of the pipe-line.

Deflector 36 has an entrance end 38 and an exit end 42, is open along the top 43 thereof, has a bottom 44 which is inclined upwardly from the bottom of inlet end 29 of unit 20 to exit end 42 of the deflector, and side walls 45 and 46. Bottom 44 at entrance end 38 of the deflector is in line with the bottom 47 of pipe 13 of the pipe-line. Top 43 of the deflector preferably is spaced below the top surface of unit 20, and it can be spaced below the top surface 48 of pipe 13 to leave a space 49 above the deflector at inlet end 29. On the other hand, the deflector can be made to fit end of pipe 13. By referring to FIGURE 2, it will be seen that top 43 of the deflector is substantially parallel with the longitudinal axis 22 of unit 20, while bottom 44 is inclined relative to said axis. The enlargement of unit 20 results in the formation of an annular space 53 which completely surrounds the deflector throughout most of the length thereof. Actually, annular space 53 within unit 20 gradually gets larger in cross section relative to deflector 36 in the direction from entrance end 38 towards exit end 42 of said deflector. FIGURE 4 illustrates how the entrance end 38 of the deflector extends the full width of inlet end 29 of the unit, while FIGURE 5 clearly illustrates how the bottom 44 moves away from the adjacent inner surface of section 20 the closer said bottom gets to exit end 42. These figures also indicate that the deflector is roughly U-shaped in cross section. When the deflector is shaped in this manner, the cross sectional area of unit 20 does not have to be larger than that of pipe-line 12, but it is preferably so.

As particulate material is moved by the conveying fluid, which is usually air, but can be liquid, along pipe-line 12 in the direction indicated by arrow 54 in FIGURE 2, there is a tendency for the material to settle on to and move along the lower surface 47 of said line. This greatly reduces the velocity of the particulate material, and can eventually result in a pile-up of said material. When re-entraining apparatus 10 is inserted in the line, particulate material moving along the lower surface of said line is picked up by the entrance end 38 of deflector 36. The momentum of the material carries it along inclined bottom 44 of the deflector, and the latter discharges said material through exit end 42 substantially in the direction of axial movement of the fluid through the apparatus, and at or near the axial centre of the moving fluid. Bottom 44 of the deflector can be shaped to extend substantially parallel to longitudinal axis 22 at exit end 42, in which case, the particulate material would be discharged in a direction parallel to axis 22. However, in some cases it is preferable to have bottom 44 inclined slightly towards axis 22 at exit end 42 so that the material is discharged at a slight angle to said axis, as indicated at 55 in FIGURE 2.

The conveying fluid enters unit 20 through inlet end 29 thereof. A large percentage of the fluid also enters entrance end 38 of deflector 36, although some of the air passes through the space 49 above the top of said entrance end. As the cross sectional area of most or all of the deflector is less than that of the outer unit 20, the fluid expands and spills over the top edges of side walls 45 and 46 of the deflector and into annular space 53 while still travelling generally in the axial direction of unit 20 and pipe-line 12. At exit end 42 of the deflector, the latter is completely surrounded by the axially moving conveying fluid so that the particulate material is discharged into the core of this moving fluid. Thus the material is directed into the portion of the moving conveying medium having the highest velocity at this point. With this arrangement, the particulate material is completely entrained in the conveying medium by the time the latter leaves unit 20.

FIGURE 6 illustrates re-entrainment apparatus 10a which is slightly different from apparatus 10 in that the sides 45 and 46 of deflector 36a converge towards exit end 42 of said deflector.

FIGURES 7 to 12 illustrate an alternative form of re-alignment apparatus 60. The main difference between this apparatus and apparatus 10 is that the former is curved in a longitudinal direction to form an elbow interconnecting pipes 62 and 63 of a conveying pipe-line. Apparatus 60 is shown as curving upwardly, but it may curve in any direction. Entraining pipe unit 64 can have tapered inlet and outlet sections similar to those of apparatus 10, but in this example, a short length of pipe 65 aligned with and of the same diameter as inlet pipe 62 extends into unit 64, and said unit has a straight inlet section 66 surrounding and spaced from pipe 65. In this case, unit 64 has an inclined straight or slightly curved section 67, a sharply curved section 68, and an inwardly tapered outlet section 69. Inlet and outlet sections 66 and 69 are respectively connected to inlet and outlet pipes 62 and 63. If desired, section 67 of this deflector can be substantially horizontal. A deflector 72 is mounted in, spaced from the wall of and extends longitudinally of unit 64, said deflector being shaped to correspond to the shape of unit 64. Deflector 72 has a bottom 74 with a portion 75 thereof inclined upwardly from an entrance end 76 of the deflector towards the longitudinal axis 77 of pipe 62. Bottom portion 75 preferably is straight, as shown, or be slightly curved. Following portion 75, the deflector bottom has another portion 78 which is of relatively sharp curvature so that the exit end 80 of the deflector faces towards outlet pipe 63. If unit section 67 is horizontal, portion 75 of deflector bottom 74 is inclined upwardly relative thereto, but if said section 67 is inclined, bottom portion 75 is inclined at substantially the same angle as the unit section, as shown. The bottom portion 78 of the deflector curves away from the adjacent surface of unit section 68, as clearly shown in FIGURE 7.

Deflector 72 is open at the top 84 thereof, and has side walls 85 and 86. If desired, the first part of the deflector may be curved in cross section, as indicated at 88 in FIGURES 7 and 10. By referring to FIGURE 10, it will be seen that side walls 85 and 86 and bottom 74 are arranged in a circle near entrance end 76 of the deflector. Spaced inwardly from this entrance end, the side walls and bottom of the deflector are substantially in a circle, see FIGURE 11, while at the exit end 80 of the deflector, the walls and bottom are more in the form of a semi-circle, as shown in FIGURE 12. An annular space 90 is formed around deflector 72 within entraining unit 64.

Apparatus 60 functions in substantially the same manner as apparatus 10. Deflector 72 re-entrains particulate material moving along the bottom of pipe 62 of the pipeline in the direction indicated by arrow 92 in FIGURE 7, and it helps to prevent particulate material moving axially along the pipe-line from separating from the conveying medium as said material moves around the elbow formed by apparatus 60. Instead of the material tending to move along the bottom or outer surface of entraining unit 64, it moves along the bottom of deflector 72, and is discharged from the end 80 thereof into the flowing conveying fluid at or near the axial centre thereof and in the direction of movement of said fluid. The particulate material flows into entraining unit 64 substantially parallel to axis 77 of pipe 62 and strikes the portion 75 of deflector bottom 74. This bottom portion deflects the material into a path in the same direction as bottom 74. The conveying medium entering deflector 72 spills out through top 84 thereof into the annular space 90.

What I claim as my invention is:

1. Apparatus for re-entraining particulate material being moved by a conveying fluid through a conveying pipe-line, comprising an entraining pipe unit having an inlet end and an outlet end and adapted to be inserted in a pipe-line so that the conveying fluid thereof moves through said unit, said inlet and outlet ends each being of substantially the same cross sectional area as said pipe-line and the pipe unit being enlarged and of larger cross sectional area than said inlet and outlet ends, and a deflector mounted in the enlarged entraining unit extending generally longitudinally thereof, said deflector being shaped to gather at the inlet end of the unit particulate material moving along a surface of said pipe-line and to direct said gathered material into the conveying fluid moving through the deflector and the unit at substantially the axial centre of said fluid and in the direction of said outlet end and the general flow of the fluid, the enlargement of said unit and the shape of the deflector permitting fluid to flow around said deflector towards said outlet end without influencing the direction of movement of the material passing over the deflector.

2. Apparatus as claimed in claim 1 in which the deflector extends from a surface of the entraining unit substantially aligned with said surface of the pipe-line to substantially the axial centre of said unit near the outlet end thereof.

3. Apparatus as claimed in claim 2 in which the deflector is formed of diminishing cross sectional area towards the outlet end of the entraining unit in order to enable fluid to flow completely around the deflector near said outlet end.

4. Apparatus as claimed in claim 2 in which the deflector is substantially circular in cross section near the inlet end of the conveying unit and gradually changes to a substantially U cross section towards the outlet end of the unit.

5. Apparatus as claimed in claim 2 in which the deflector is substantially circular in cross section near the inlet end of the conveying unit and gradually changes to a comparatively shallow segment of a circle towards the outlet end of the unit.

6. Apparatus as claimed in claim 2 in which the deflector is open along at least most of the top thereof so that the interior of the deflector is in communication with the interior of the entraining unit throughout substantially the length of said deflector.

7. Apparatus as claimed in claim 6 in which the entraining unit is straight and adapted to extend along the axial centre line of the conveying pipe-line.

8. Apparatus as claimed in claim 6 in which the entraining unit is generally curved in a longitudinal direction and the deflector is longitudinally generally curved to agree with the curve of said unit.

9. Apparatus as claimed in claim 8 in which the radius of the deflector is long at the inlet end of the entraining unit and changes to a smaller radius towards the outlet end of the unit.

10. Apparatus as claimed in claim 8 in which the deflector is formed with a straight section at the inlet end of the entraining unit and with a curved section extending from said straight section towards the outlet end of the unit.

11. Apparatus as claimed in claim 10 in which said straight section of the deflector is inclined inwardly of the unit in the direction towards the outlet end thereof.

12. Apparatus as claimed in claim 6 in which the deflector is substantially circular in cross section near the inlet end of the entraining unit and gradually changes to a substantially U cross section towards the outlet end of the unit.

13. Apparatus as claimed in claim 6 in which the deflector is substantially circular in cross section near the inlet end of the entraining unit and gradually changes to a comparatively shallow segment of a circle towards the outlet end of the unit.

14. Apparatus as claimed in claim 1 in which said entraining unit includes an inlet section and an outlet section at the inlet and outlet ends respectively thereof, each of said inlet and outlet sections converging in cross section in a direction extending axially away from the entraining unit.

15. Apparatus as claimed in claim 14 in which the deflector extends at one end into the inlet section and at its opposite end terminates short of the outlet section.

16. Apparatus for re-entraining particulate material being moved by a conveying fluid through a conveying pipe-line, comprising an entraining pipe unit having an inlet end and an outlet end and adapted to be inserted in a pipe-line so that the conveying fluid thereof moves through said unit, and a deflector mounted in the entraining unit extending generally longitudinally thereof and positioned to gather at the inlet end of the unit particulate material moving along a surface of said pipe-line and to direct said gathered material into the conveying fluid moving through the unit at substantially the axial centre of said fluid and in the direction of said outlet end and the general flow of the fluid, said deflector being substantially circular in cross section near the inlet end and gradually changing to a substantially U cross section towards the outlet end of the unit, whereby fluid can flow through and around said deflector towards said outlet end.

17. Apparatus as claimed in claim 16 in which the deflector is formed of diminishing cross sectional area towards the outlet end of the entraining unit in order to enable fluid to flow completely around the deflector near said outlet end.

18. Apparatus as claimed in claim 16 in which the deflector is open along at least most of the top thereof so that the interior of the deflector is in communication with the interior of the entraining unit throughout substantially the length of said deflector.

19. Apparatus as claimed in claim 16 in which the entraining unit is straight and adapted to extend along the axial centre line of the conveying pipe-line.

20. Apparatus as claimed in claim 16 in which the entraining unit is generally curved in a longitudinal direction and the deflector is longitudinally generally curved to agree with the curve of said unit.

21. Apparatus as claimed in claim 16 in which the deflector is formed with a straight section at the inlet end of the entraining unit and with a curved section extending from said straight section towards the outlet end of the unit.

22. Apparatus as claimed in claim 21 in which said straight section of the deflector is inclined inwardly of the unit in the direction towards the outlet end thereof.

23. Apparatus as claimed in claim 16 in which entraining unit includes an inlet section and an outlet section at the inlet end and outlet ends respectively thereof, each of said inlet and outlet sections converging in cross section in a direction extending axially away from the entraining unit.

24. Apparatus as claimed in claim 23 in which the deflector extends at one end into the inlet section and at its opposite end terminates short of the outlet section.

25. The method of reentraining particulate material being moved by a conveying fluid through a conveying pipe-line, which comprises directing the conveying fluid through a diametrically enlarged section in the conveying pipe-line, guiding by a deflector particulate material moving near the confining wall of said pipe-line towards the axial centre of said enlarged section, and discharging said guided material substantially along said centre in the direction of movement of the conveying fluid, whereby said fluid on entering said enlarged section expands around the particulate material being discharged therein.

References Cited

UNITED STATES PATENTS 1,827,727  10/1931  Blizard _____ 302—64

FOREIGN PATENTS 1,152,951  8/1963  Germany.
731,888  6/1955  Great Britain.

ANDRES H. NIELSEN, *Primary Examiner.*